(12) United States Patent
Cheung et al.

(10) Patent No.: US 9,884,384 B1
(45) Date of Patent: Feb. 6, 2018

(54) SOLDER DROSS RECOVERY MODULE

(71) Applicant: Flextronics AP, LLC., Broomfield, CO (US)

(72) Inventors: Dason Cheung, Fremont, CA (US); Murad Kurwa, San Jose, CA (US)

(73) Assignee: Flextronics AP, LLC, Broomfield, CO (US)

( * ) Notice: Subject to any disclaimer, the term of this patent is extended or adjusted under 35 U.S.C. 154(b) by 79 days.

(21) Appl. No.: 15/158,308

(22) Filed: May 18, 2016

(51) Int. Cl.
*B23K 1/00* (2006.01)
*B23K 3/08* (2006.01)
*B23K 1/08* (2006.01)
*B23K 3/06* (2006.01)
*B23K 101/42* (2006.01)

(52) U.S. Cl.
CPC ............... *B23K 3/08* (2013.01); *B23K 1/085* (2013.01); *B23K 3/0653* (2013.01); *B23K 2201/42* (2013.01)

(58) Field of Classification Search
CPC ............ B23K 1/008; B23K 1/085; B23K 3/0646–3/0692
USPC .................................... 266/227–232; 228/34
See application file for complete search history.

(56) References Cited

U.S. PATENT DOCUMENTS

| | | | | |
|---|---|---|---|---|
| 1,821,105 A * | 9/1931 | McMeans | ................ | C23C 2/003 118/422 |
| 2,087,711 A * | 7/1937 | Weiss | ................... | B23K 3/0646 118/125 |
| 2,690,005 A * | 9/1954 | Schoenfeld, Jr. | ..... | B23K 3/0692 118/202 |
| 2,937,757 A * | 5/1960 | Pisani | ................... | B23K 3/0646 128/DIG. 24 |
| 3,059,604 A * | 10/1962 | Brandys | ............... | B23K 3/0669 118/423 |
| 3,259,293 A | 7/1966 | Dezzani | | |
| 3,955,805 A * | 5/1976 | Sapko | ................... | F27D 3/1554 266/228 |
| 4,530,456 A | 7/1985 | Michelotti | | |
| 4,752,025 A | 6/1988 | Stach et al. | | |
| 5,087,356 A * | 2/1992 | Webb | ....................... | B23K 3/08 15/250.17 |
| 5,409,543 A | 4/1995 | Panitz et al. | | |
| 5,598,965 A | 2/1997 | Scheu | | |
| 5,770,835 A | 6/1998 | Sakuyama et al. | | |
| 6,110,322 A | 8/2000 | Tech et al. | | |
| 6,152,353 A | 11/2000 | Sani Bakhitari | | |
| 6,284,190 B1 * | 9/2001 | van der Lugt | ........... | B23K 3/08 266/227 |
| 6,336,990 B1 | 1/2002 | Tanaka et al. | | |
| 6,578,752 B1 * | 6/2003 | Willemen | ............ | B23K 3/0653 228/256 |

(Continued)

FOREIGN PATENT DOCUMENTS

JP          63080962 A  *  4/1988  ........... B23K 3/0646

*Primary Examiner* — Erin Saad
*Assistant Examiner* — Carlos Gamino
(74) *Attorney, Agent, or Firm* — Haverstock & Owens LLP (57) ABSTRACT

A solder dross recovery module has gears and a waste collection chamber positioned within a solder pot. The gears are configured to draw in solder dross from a surface of molten solder stored in the solder pot. The gears apply pressure to the solder dross so as to separate solder from the solder dross. The recovered solder is returned to the molten solder in the solder pot. A resulting waste material is collected in the waste collection chamber.

23 Claims, 8 Drawing Sheets

(56) References Cited

U.S. PATENT DOCUMENTS

| | | | |
|---|---|---|---|
| 6,666,370 B2* | 12/2003 | McDonald | B23K 3/06 228/203 |
| 6,840,743 B2 | 1/2005 | Herke et al. | |
| 6,890,430 B2* | 5/2005 | Mawatari | B23K 1/206 210/173 |
| 6,948,650 B2* | 9/2005 | Howell | B23K 3/06 228/259 |
| 9,293,636 B2 | 3/2016 | Cheung et al. | |
| 2002/0005376 A1* | 1/2002 | Tooyama | B23K 3/0646 209/11 |
| 2002/0027157 A1* | 3/2002 | Takano | B23K 3/0653 228/219 |
| 2002/0092897 A1* | 7/2002 | Morris | B23K 3/08 228/256 |
| 2002/0134422 A1 | 9/2002 | Bauman et al. | |
| 2003/0000936 A1 | 1/2003 | Kim et al. | |
| 2003/0025906 A1 | 2/2003 | Sheffer | |
| 2006/0008759 A1 | 1/2006 | Shiozawa | |
| 2006/0273141 A1 | 12/2006 | Saito et al. | |
| 2009/0308430 A1 | 12/2009 | Everett et al. | |
| 2012/0012645 A1 | 1/2012 | Motomura et al. | |
| 2012/0273559 A1 | 1/2012 | Patterson | |

\* cited by examiner

SOLDER DROSS RECOVERY MODULE

FIELD OF THE INVENTION

The present invention is generally directed to recovering solder from solder dross. More specifically, the present invention is directed to a solder dross recovery module that can be attached to a solder pot.

BACKGROUND OF THE INVENTION

Wave soldering is a bulk soldering process used to solder components to a printed circuit board. Solder is held in a wave soldering pot where the solder is heated and maintained in a molten state. The molten solder is pumped through a wave nozzle to form an up-welling of solder that appears as a standing wave. The printed circuit board is passed over the molten solder wave such that the component leads contact the molten solder.

An issue with the wave soldering device is that maintaining the solder in a molted state results in the formation of solder dross. Solder dross is a mass of impurities floating on the molten solder. The surface of the molten solder is exposed to air, and the solder dross is formed by oxidation of the molten solder.

Solder is an expensive material, but the solder dross is not useable due to the impurities. It is common practice to recycle the solder dross back to solder, which can then be reused. Different recycling techniques have been developed. One recycling technique is the periodic application of chemicals to the solder dross formed on the surface of the molten solder. The chemicals dissolve the oxides within the solder dross, however a resulting slag remains as waste. This slag must be periodically removed, typically by skimming. The slag is a messy material that may dirty other components of the wave soldering apparatus. Removing the slag is done manually, which is time consuming and costly, as well as dangerous since the molten solder is heated to at least 500 degrees Fahrenheit. The chemicals themselves are also costly and need to be periodically applied. Examples of such chemicals include a sodium hydroxide additive or a surfactant. A wave oil can also be used to reduce the formation of solder dross. The wave oil is applied to the surface of the molten solder and acts as a barrier between the molten solder and the atmosphere, thereby reducing oxidation and the formation of solder dross. However, wave oil does not completely eliminate the formation of solder dross, so the solder dross that does form still needs to be dealt with. The wave oil is also costly and needs to be periodically applied.

Another recycling technique is to physically separate the solder from the solder dross. In some cases, the solder dross is processed while still on the surface of the molten solder. This separation process can be as simple as using two stainless steel spatulas to squeeze the solder out from the solder dross. However, the safety and health of the operators is a concern considering the high temperature of the molten solder and the generation of harmful airborne particles during the separation process. In other cases, offline solder dross recovery machines are used. An operator needs to remove the solder dross from the wave soldering pot and place the recovered solder dross into a recovery pot in the offline solder dross recovery machine. However, during this transfer process the solder dross cools and hardens. For the machine to separate the solder from the solder dross, the solder dross must be heated to a molten temperature. This requires the machine to have a heater. Time is also required to melt the cooled solder dross. Also, not all solder is made of the same material, and therefore different offline solder dross recover machines are needed for different types of solder so as to avoid contamination. Good ventilation is also required during the operation.

SUMMARY OF THE INVENTION

Embodiments are directed to a solder dross recovery module having gears and a waste collection chamber positioned within a solder pot. The gears are configured to draw in solder dross from a surface of molten solder stored in the solder pot. The gears apply pressure to the solder dross so as to separate solder from the solder dross. The recovered solder is returned to the molten solder in the solder pot. A resulting waste material is collected in the waste collection chamber.

In an aspect, a solder dross recovery module is disclosed. The solder dross recovery module includes a plurality of interconnected gears, a motor and a waste material collector. At least one of the gears is at least partially submerged in molten solder and solder dross floating on a surface of the molten solder contained within a solder pot. The motor is coupled to the plurality of interconnected gears. The motor is configured to rotate the plurality of interconnected gears and the plurality of interconnected gears are configured to apply pressure to the solder dross floating on the surface of the molten solder thereby separating solder from the solder dross and dispensing a waste material. The waste material collector is positioned adjacent to the plurality of interconnected gears and configured to collect the dispensed waste material. In some embodiments, the solder dross recovery module further comprises support walls configured to support the plurality of interconnected gears and to enable the separated solder to be fed back to the molten solder in the solder pot. In some embodiments, the motor and the plurality of interconnected gears are configured to drive the plurality of interconnected gears in a forward direction thereby drawing molten solder in the solder pot and solder dross floating on the surface of the molten solder toward the solder dross recovery module. In some embodiments, the motor and the plurality of interconnected gears are further configured to drive the plurality of interconnected gears in a backward direction opposite the forward direction. In some embodiments, the plurality of interconnected gears comprise a first subset of gears including the at least one gear at least partially submerged in molten solder and a second gear, wherein the solder dross is drawn between the at least one gear at least partially submerged in molten solder and the second gear, and pressure is applied to the solder dross by the at least one gear at least partially submerged in molten solder and the second gear. In some embodiments, the first subset of gears of the plurality of interconnected gears comprise spur gears. In some embodiments, the plurality of interconnected gears further comprise a second subset of gears, wherein the second subset of gears are coupled to the motor. In some embodiments, the solder dross recovery module further comprises a camshaft, wherein a first end of the camshaft is coupled to the first subset of gears and a second end of the camshaft is coupled to the second subset of gears. In some embodiments, the first subset of gears and the waste material collector are positioned within an interior of the solder pot and the second subset of gears and the motor are positioned external to the solder pot. In some embodiments, the second subset of gears of the plurality of interconnected gears comprise miter gears. In some embodiments, the solder dross recovery module further comprises a mounting structure configured to mount the solder dross recovery module to the solder pot. In some embodiments, the mounting structure comprises a U-clamp configured to fit over a side wall edge of the solder pot.

In another aspect, the solder dross recovery module is included as part of a solder dross recovery system. The solder dross recovery system includes a solder pot and the solder dross recovery module. The solder pot is configured to maintain and contain molten solder, wherein solder dross is formed on at least a portion of a surface of the molten solder. In some embodiments, the solder dross recovery system further comprises a control module coupled to control the motor.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a solder dross recovery module. Those of ordinary skill in the art will realize that the following detailed description of the solder dross recovery module is illustrative only and is not intended to be in any way limiting. Other embodiments of the solder dross recovery module will readily suggest themselves to such skilled persons having the benefit of this disclosure.

Reference will now be made in detail to implementations of the solder dross recovery module as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
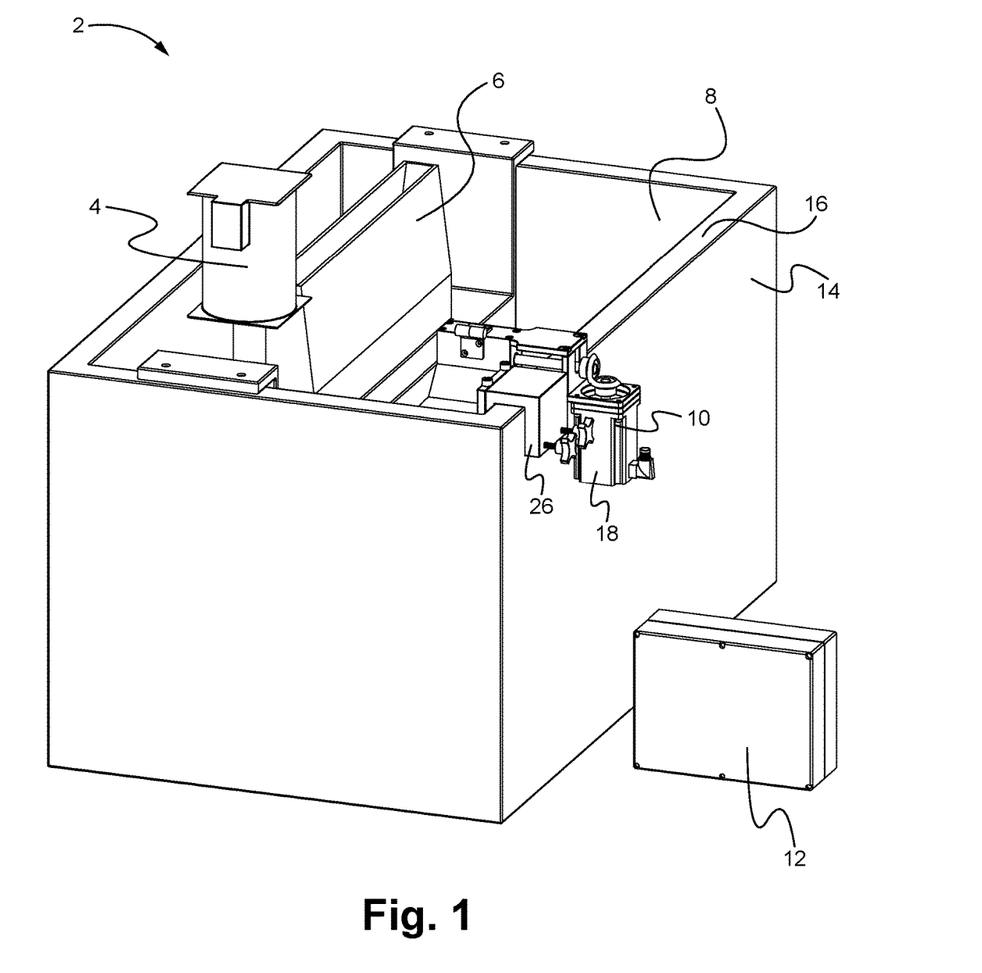
FIG. 1 illustrates a solder dross recovery system according to some embodiments.

FIG. 1 illustrates a solder dross recovery system according to some embodiments. The solder dross recovery system includes a solder pot for maintaining and containing molten solder and a solder dross recovery module. In some embodiments, the solder pot is included as part of a wave soldering apparatus. In general, the solder pot can be part of any apparatus that requires maintaining and containing molten solder. In the exemplary configuration shown in FIG. 1, the solder dross recovery system includes a wave soldering apparatus 2 and a solder dross recovery module 10. The wave soldering apparatus 2 includes a solder pump 4, a wave nozzle 6 and a solder pot 8. The solder pot 8 includes a heater (not shown) for maintaining solder in a molten state. The solder pump 4 pumps molten solder up through the wave nozzle 6 forming a wave of molten solder. The solder pot 8 includes a bottom wall and side walls for containing the molten solder. The molten solder is exposed to the environment at the top surface.

Figure 2:
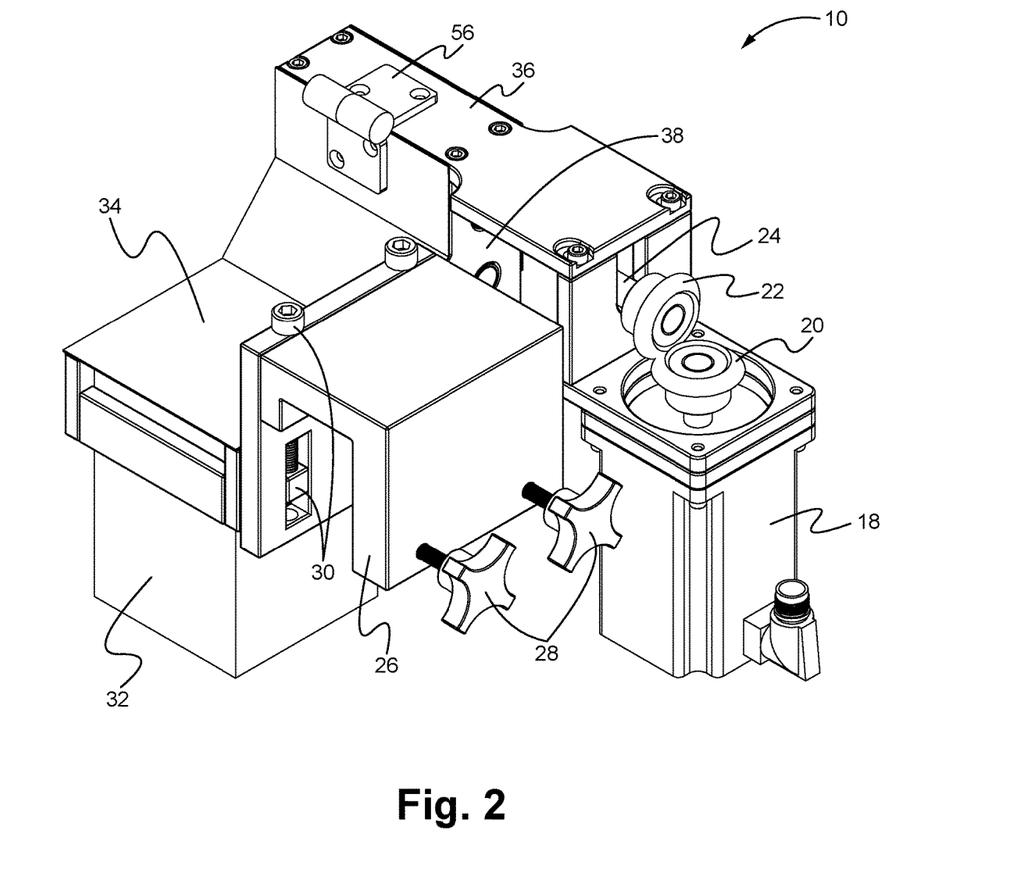
FIG. 2 illustrates a top-down front right perspective view of the solder dross recovery module according to some embodiments.

The solder dross recovery module 10 includes a mounting structure and is mounted to a side wall edge 16 of one of the side walls 14. In some embodiments, the mounting structure includes a U-clamp 26 configured to fit over and rest on the side wall edge 16. The U-clamp 26 is secured to the side wall 14 by locking knobs 28 (FIG. 2). A portion of the solder dross recovery module 10 is suspended within the solder pot 8 and submerged in the molten solder. The solder dross recovery module 10 also includes a motor 18 which is suspended outside the solder pot 8. The motor 18 is controlled by a coupled controller and motor driver unit 12. In some embodiments, the motor 18 is covered or partially covered by a thermal insulating material so as to thermally insulate the motor 18 from the high temperature of the molten solder.

Figure 3:
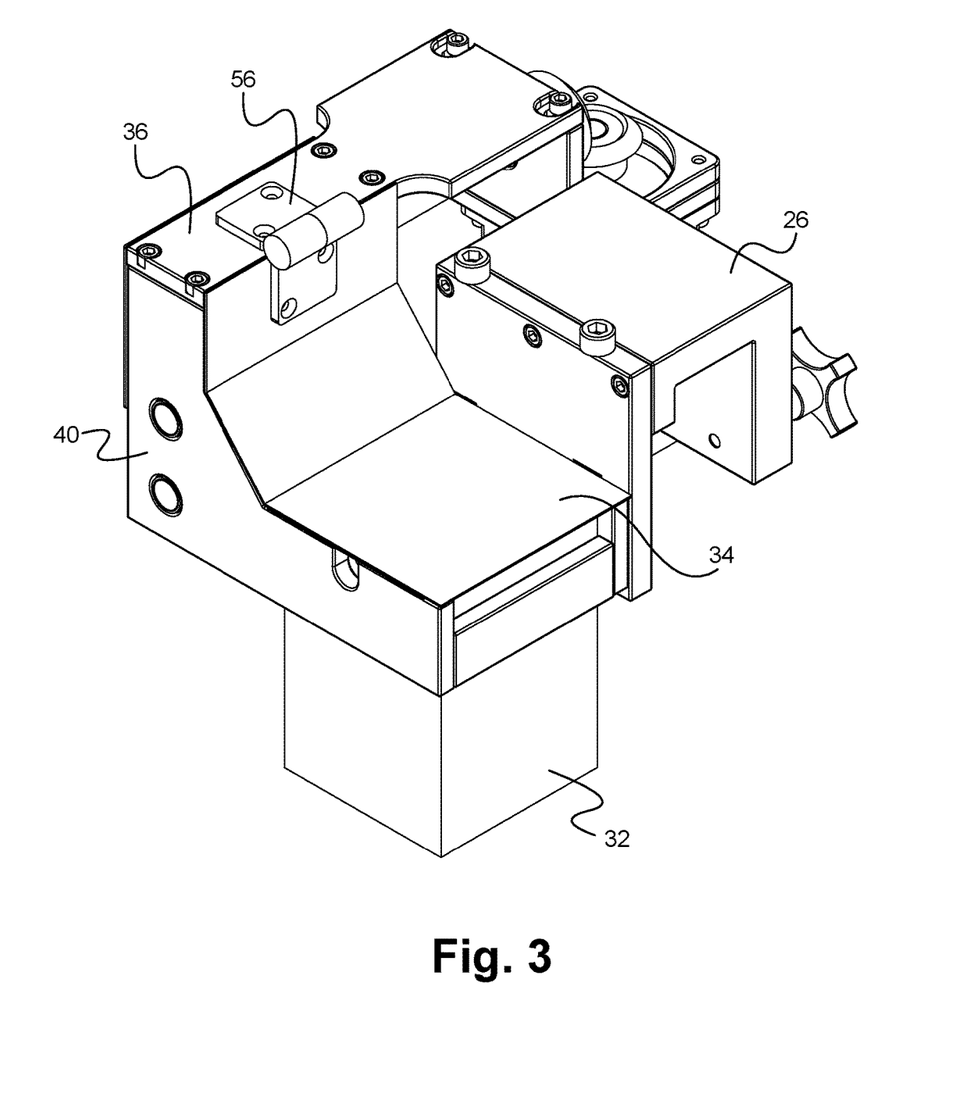
FIG. 3 illustrates a top-down front left perspective view of the solder dross recovery module according to some embodiments.
Figure 4:
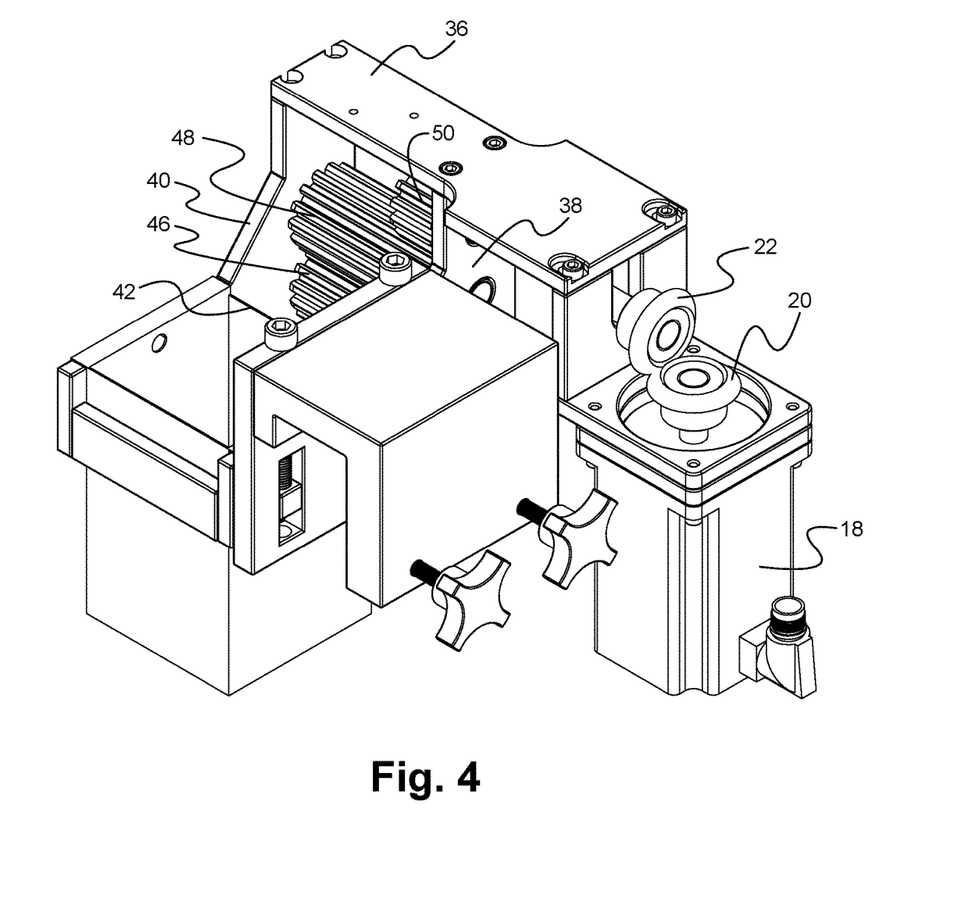
FIG. 4 illustrates the same view of the solder dross recovery module of FIG. 2 with the cover removed.
Figure 8:
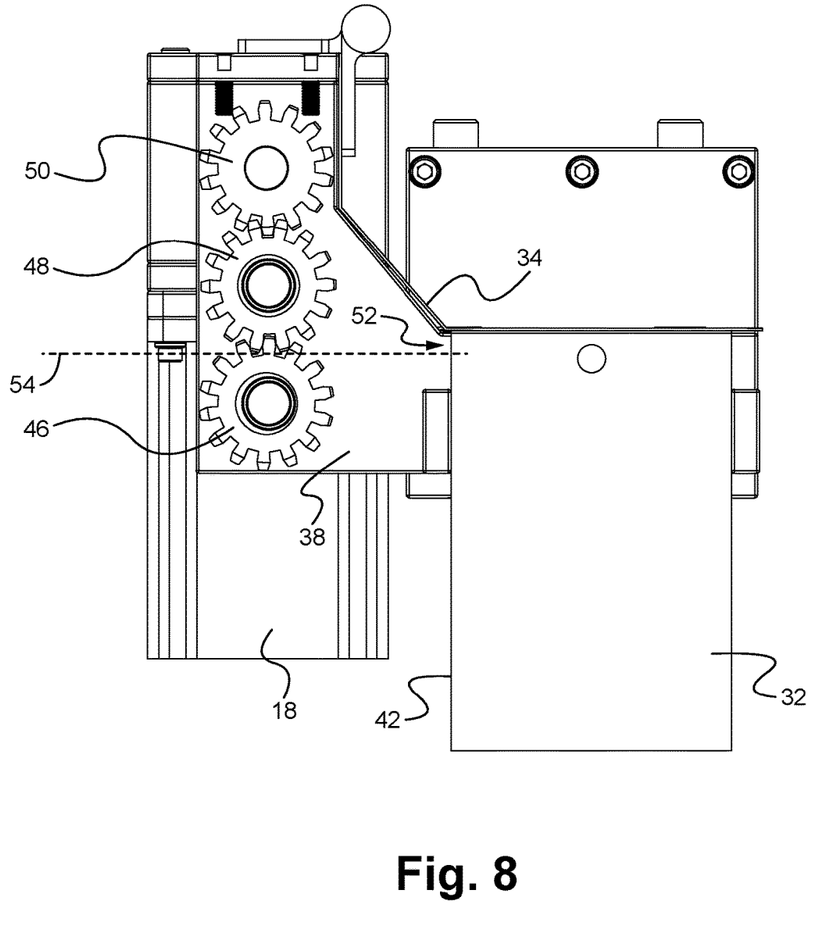
FIG. 8 illustrates a left side view of the solder dross recovery module with a side wall removed.

FIG. 2 illustrates a top-down front right perspective view of the solder dross recovery module 10 according to some embodiments. FIG. 3 illustrates a top-down front left perspective view of the solder dross recovery module 10 according to some embodiments. The solder dross recovery module 10 includes a waste collector 32 and a cover 34 movably coupled to a top wall 36 via a hinge 56. FIG. 4 illustrates the same view of the solder dross recovery module 10 of FIG. 2 with the cover 34 removed. The solder dross recovery module 10 includes gears 46, 48 and 50. In some embodiments, the gears 46, 48, 50 are each spur gears interconnected such that rotating the gear 50 translates to rotating the gears 46 and 48, as shown in FIG. 8. The gears 46, 48 are coupled at either end to side walls 38 and 40. A wall 42 extends between the side walls 38, 40. The gear 50 is connected to a first end of a cam shaft 24. A gear 22 is connected to a second end of the cam shaft 24. A gear 20 is coupled to the motor 18. In some embodiments, the gears 20 and 22 are each miter gears interconnected such that rotating the gear 20 translates to rotating the gear 22, which in turn rotates the cam shaft 24 which rotates the gear 50. The gear 20 is driven by the motor 18. The gear 20 can be rotated in either the clockwise or counter-clockwise direction depending on control signaling supplied by the controller and motor drive unit 12.

Figure 5:
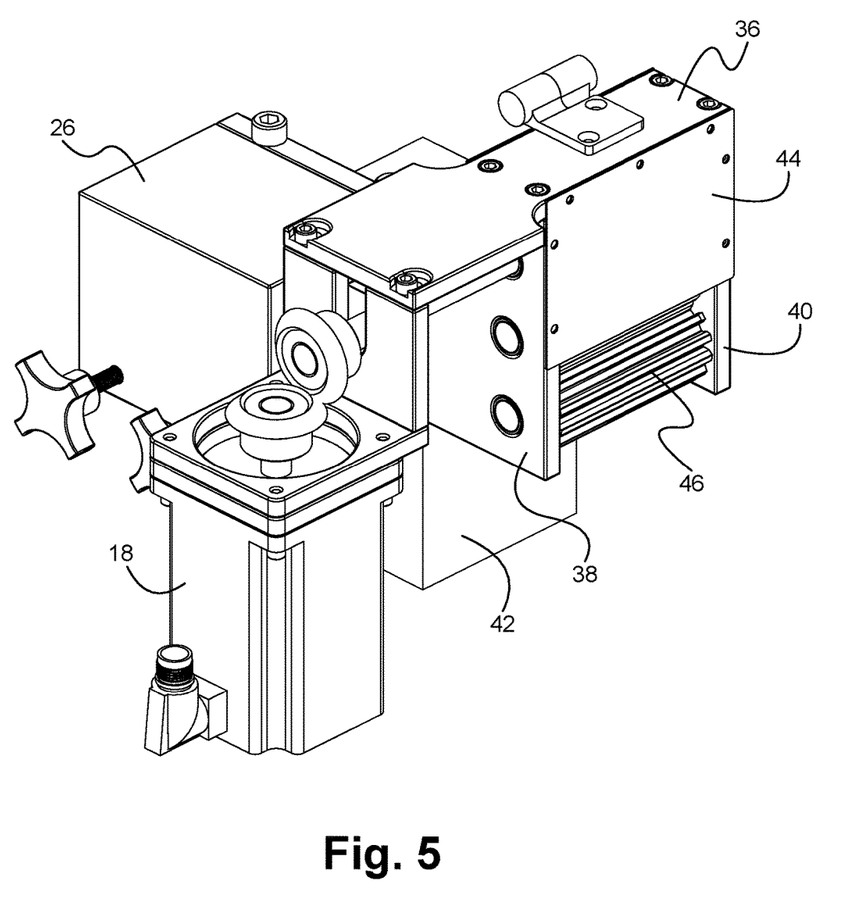
FIG. 5 illustrates a top-down back right perspective view of the solder dross recovery module according to some embodiments.
Figure 6:
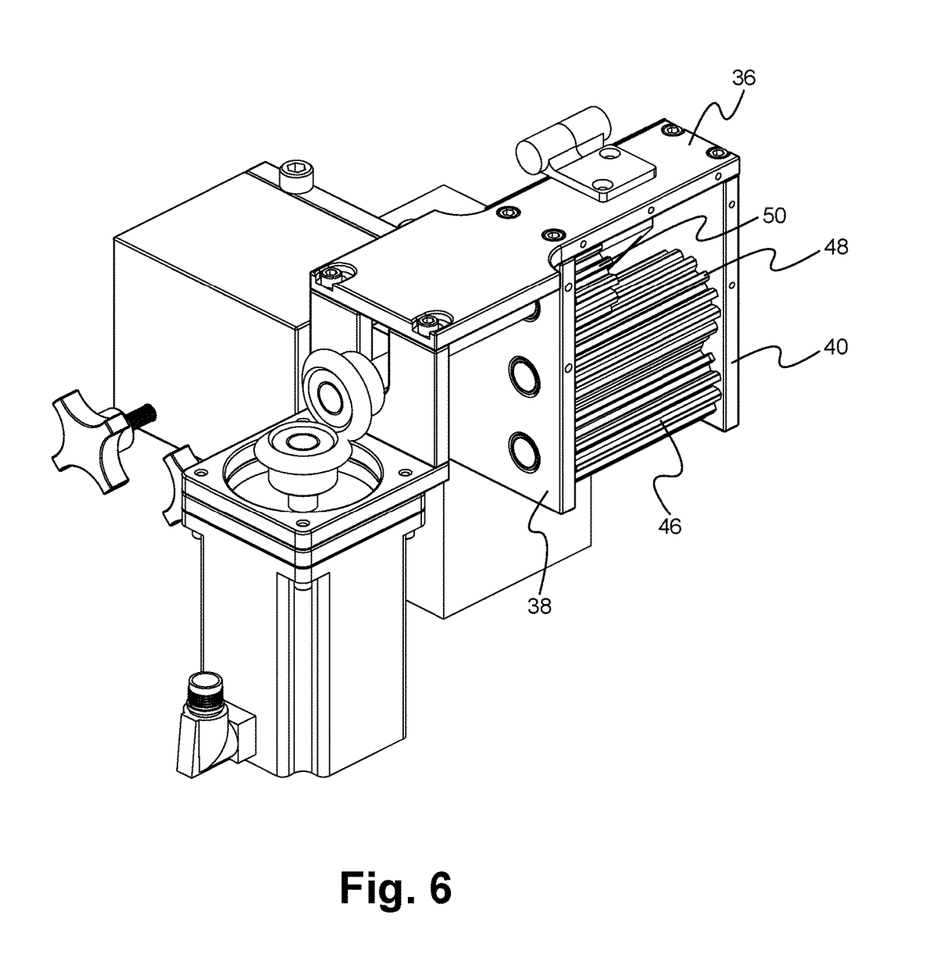
FIG. 6 illustrates the same view of the solder dross recovery module of FIG. 5 with a side wall removed.

FIG. 5 illustrates a top-down back right perspective view of the solder dross recovery module 10 according to some embodiments. A side wall 44 covers the gear 50 and partially covers the gear 48, but leaves exposed the gear 46. FIG. 6 illustrates the same view of the solder dross recovery module 10 of FIG. 5 with the side wall 44 removed. As shown in FIGS. 5 and 6, there is no bottom wall connecting the bottoms of side walls 38 and 40, and as such the underside of gear 46 is left exposed.

Figure 7:
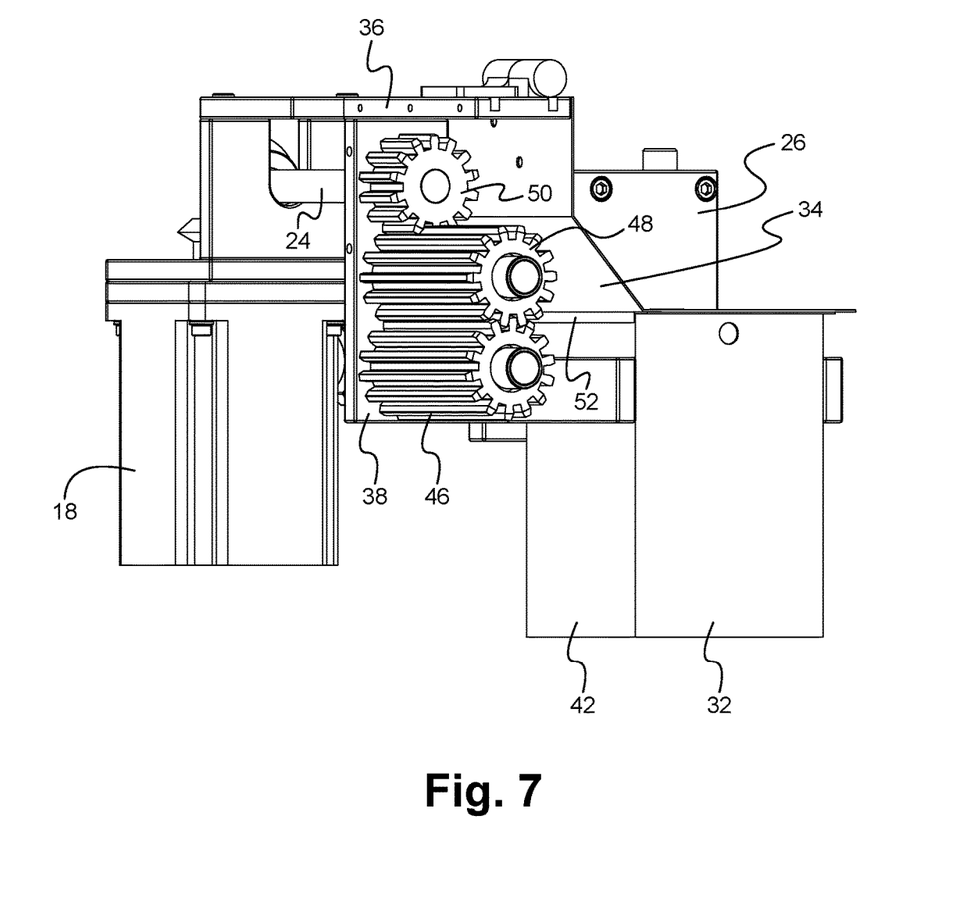
FIG. 7 illustrates a back left side view of the solder dross recovery module with two side walls removed.

FIG. 7 illustrates a back left side view of the solder dross recovery module 10 with the side wall 40 and the side wall 44 removed. The wall 42 does not extend to contact the cover 34. A waste entrance 52 is an opening formed between the top edge of the wall 42 and the cover 34.

FIG. 8 illustrates a left side view of the solder dross recovery module 10 with the side wall 40 removed. The solder dross recovery module 10 is mounted to the side wall 14 (FIG. 1) of the solder pot 8 such that the waste collector 32, side walls 38, 40, the wall 42 and the gears 46, 48 are partially submerged in the molten solder. In the exemplary configuration shown in FIG. 8, the solder dross recovery module 10 is positioned with a solder level 54. Solder level 54 is substantially aligned with the mesh point of the gears 46, 48 and at a level lower than the waste entrance 52 such that molten solder does not pass over the top edge of the wall 42 and enter the waste collector 32. The position of the solder dross recovery module 10 relative to the molten solder lever can be adjusted up or down by adjusting the height adjustment mechanism 30 (FIG. 2), thereby adjusting the solder level 54. In some embodiments, the solder dross recovery module 10 is configured such that the side wall 38 rests against the inner surface of the side wall 14 (FIG. 1) when the solder dross recovery module 10 is mounted to the side wall 14.

In operation, the motor 18 drives the gear 20 which rotates the gear 22, the cam shaft 24 and the gear 50. Rotating the gear 20 clockwise results in clockwise rotation of the gear 50. Clockwise rotation of the gear 50 translates to counter-clockwise rotation of the gear 48 and clockwise rotation of the gear 46. Counter-clockwise-rotation of the gear 48 and clockwise rotation of the gear 46 draws molten solder from outside the solder dross recovery module 10 toward the gears 46, 48. As applied to FIG. 8 molten solder is drawn from left of the gears 46, 48 toward the gears, in other words from left to right. This is referred to as forward rotation of the gears. Rotating the gears in the opposite directions, such that the gear 48 rotates clockwise and the gear 46 rotates counter-clockwise, is referred to as backward rotation of the gears. Solder dross forms on the surface of the molten solder, for example solder dross is present starting from the solder level 54 (FIG. 8) upward. As molten solder is drawn to the gears 46, 48 rotating in the forward direction, so too is the solder dross floating on the surface of the molten solder. The gears 46, 48 apply pressure to the solder dross, such as by squeezing, thereby separating solder from the solder dross, leaving behind a waste material. The separated solder falls into the molten solder within the space enclosed by the side walls 38, 40 and wall 42. As the gears 46, 48 continue to rotate, the waste material collects behind the gears 46, 48 in the space enclosed by the side walls 38, 40, the wall 42, and the cover 34 and floats above the solder level 54. The waste material is eventually pushed through the waste entrance 52 into the waste collector 32.

In some embodiments, a sensor (not shown) is positioned in the waste collector 32 to indicate when the waste collector 32 is full of waste material and needs to be emptied. In some embodiments, the waste collector 32 includes a removable container that can be removed from the remainder of the solder dross recovery module 10. This enables emptying of the waste collector 32 without having to dismount the entire solder dross recovery module 10 from the solder pot 8. The waste collector 32 and the removable container are accessible by raising the cover 34.

The motor 18 can be controlled by the controller and motor drive unit 12 to turn the gears according to various patterns and/or speeds. For example, the motor 18 can turn the gears at a constant rate of speed and in a continuous forward direction. In another example, the gears can be rotated forward for a set period, such as 5 steps of the motor, and then rotated backwards for another set period, such as 4 steps of the motor, and then repeat. Changing the rotation forward and backward cycles portions of the solder dross back and forth through the gears 46, 48, thereby increasing a duration during which pressure is applied to the solder dross by the gears 46, 48.

The solder dross recovery module and its implementation with a solder pot provides numerous advantages. There is no need for centralized off-line equipment required for different alloys, which reduces handling and equipment cost. The solder dross recovery module is smaller and much less expensive than a separate off-line device. There is no need to re-heat collected solder dross as in a separate off-line device since the solder dross is processed within the solder pot. This process removes the need to track the type of solder recovered and avoids possible solder type mix up. There is no need for additional chemicals, which reduces indirect material consumption. There is no need for operators to remove solder dross from the solder pot to different area for solder dross recovery. Performing the solder dross recovery in the solder pot reduces maintenance to the solder pot. The solder dross recovery module requires less maintenance than a separate off-line device, simply replace low cost spur gears when worn out.

The present application has been described in terms of specific embodiments incorporating details to facilitate the understanding of the principles of construction and operation of the solder dross recovery module. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A solder dross recovery module comprising:
   a. a plurality of interconnected gears, wherein at least one of the gears is at least partially submerged in molten solder and solder dross floating on a surface of the molten solder contained within a solder pot,
      wherein the plurality of interconnected gears comprise a first subset of gears including the at least one gear at least partially submerged in the molten solder and a second gear, wherein the solder dross is drawn between the at least one gear at least partially submerged in the molten solder and the second gear, and the pressure is applied to the solder dross by the at least one gear at least partially submerged in the molten solder and the second gear;
   b. a motor coupled to the plurality of interconnected gears, wherein the motor is configured to rotate the plurality of interconnected gears and the plurality of interconnected gears are configured to apply pressure to the solder dross floating on the surface of the molten solder thereby separating solder from the solder dross and dispensing a waste material; and c. a waste material collector positioned adjacent to the plurality of interconnected gears and configured to collect the dispensed waste material.

2. The solder dross recovery module of claim 1 further comprises support walls configured to support the plurality of interconnected gears and to enable the separated solder to be fed back to the molten solder in the solder pot.

3. The solder dross recovery module of claim 1 wherein the motor is configured to drive the plurality of interconnected gears in a forward direction thereby drawing the molten solder in the solder pot and the solder dross floating on the surface of the molten solder toward the solder dross recovery module.

4. The solder dross recovery module of claim 3 wherein the motor is further configured to drive the plurality of interconnected gears in a backward direction opposite the forward direction.

5. The solder dross recovery module of claim 3 wherein the first subset of gears of the plurality of interconnected gears comprise spur gears.

6. The solder dross recovery module of claim 3 wherein the plurality of interconnected gears further comprise a second subset of gears, wherein the second subset of gears are coupled to the motor.

7. The solder dross recovery module of claim 6 further comprising a camshaft, wherein a first end of the camshaft is coupled to the first subset of gears and a second end of the camshaft is coupled to the second subset of gears.

8. The solder dross recovery module of claim 7 wherein the first subset of gears and the waste material collector are positioned within an interior of the solder pot and the second subset of gears and the motor are positioned external to the solder pot.

9. The solder dross recovery module of claim 6 wherein the second subset of gears of the plurality of interconnected gears comprise miter gears.

10. The solder dross recovery module of claim 1 further comprising a mounting structure configured to mount the solder dross recovery module to the solder pot.

11. The solder dross recovery module of claim 10 wherein the mounting structure comprises a U-clamp configured to fit over a side wall edge of the solder pot.

12. A solder dross recovery system comprising:
a. a solder pot configured to maintain and contain molten solder, wherein solder dross is formed on at least a portion of a surface of the molten solder; and
b. a solder dross recovery module mounted to the solder pot, wherein the solder dross recovery module comprises:
i. a plurality of interconnected gears, wherein at least one of the gears is at least partially submerged in the molten solder,
wherein the plurality of interconnected gears comprise a first subset of gears including the at least one gear at least partially submerged in the molten solder and a second gear, wherein the solder dross is drawn between the at least one gear at least partially submerged in the molten solder and the second gear, and the pressure is applied to the solder dross by the at least one gear at least partially submerged in the molten solder and the second gear;
ii. a motor coupled to the plurality of interconnected gears, wherein the motor is configured to rotate the plurality of interconnected gears thereby drawing molten solder and solder dross toward the solder dross recovery module, and the plurality of interconnected gears are configured to apply pressure to the solder dross floating on the surface of the molten solder thereby separating solder from the solder dross and dispensing a waste material; and
iii. a waste material collector positioned adjacent to the plurality of interconnected gears and configured to collect the dispensed waste material.

13. The solder dross recovery system of claim 12 wherein the solder dross recovery system further comprises support walls configured to support the plurality of interconnected gears and to enable the separated solder to be fed back to the molten solder in the solder pot.

14. The solder dross recovery module of claim 12 wherein the motor is configured to drive the plurality of interconnected gears in a forward direction thereby drawing the molten solder in the solder pot and the solder dross floating on the surface of the molten solder toward the solder dross recovery module.

15. The solder dross recovery system of claim 14 wherein the motor is further configured to drive the plurality of interconnected gears in a backward direction opposite the forward direction.

16. The solder dross recovery system of claim 15 further comprising a control module coupled to the motor, wherein the control module is configured to selectively drive the motor in an alternating first direction and a second direction thereby driving the plurality of interconnected gears in an alternating forward direction and backward direction so as to increase a duration during which pressure is applied to the solder dross.

17. The solder dross recovery system of claim 14 wherein the first subset of gears of the plurality of interconnected gears comprise spur gears.

18. The solder dross recovery system of claim 14 wherein the plurality of interconnected gears further comprise a second subset of gears, wherein the second subset of gears are coupled to the motor.

19. The solder dross recovery system of claim 18 further comprising a camshaft, wherein a first end of the camshaft is coupled to the first subset of gears and a second end of the camshaft is coupled to the second subset of gears.

20. The solder dross recovery system of claim 19 wherein the first subset of gears and the waste material collector are positioned within an interior of the solder pot and the second subset of gears and the motor are positioned external to the solder pot.

21. The solder dross recovery system of claim 18 wherein the second subset of gears of the plurality of interconnected gears comprise miter gears.

22. The solder dross recovery system of claim 12 wherein the solder dross recovery module further comprises a mounting structure configured for the mounting of the solder dross recovery module to the solder pot.

23. The solder dross recovery system of claim 22 wherein the mounting structure comprises a U-clamp configured to fit over a side wall edge of the solder pot.

* * * * *